United States Patent
Kv et al.

(10) Patent No.: US 10,841,176 B2
(45) Date of Patent: Nov. 17, 2020

(54) SYSTEMS AND METHODS FOR MANAGING A PLURALITY OF WIND POWER PLANTS

(71) Applicants: Lal Kv, Bangalore (IN); Dimitrios Katsikas, Aarhus (DK); Henrik Wahlberg, Herning (DK)

(72) Inventors: Lal Kv, Bangalore (IN); Dimitrios Katsikas, Aarhus (DK); Henrik Wahlberg, Herning (DK)

(73) Assignee: Siemens Wind Power A/S, Brande (DK)

( * ) Notice: Subject to any disclaimer, the term of this patent is extended or adjusted under 35 U.S.C. 154(b) by 249 days.

(21) Appl. No.: 15/473,762

(22) Filed: Mar. 30, 2017

(65) Prior Publication Data
US 2018/0287886 A1    Oct. 4, 2018

(51) Int. Cl.
*G06F 15/173*    (2006.01)
*H04L 12/24*    (2006.01)
(Continued)

(52) U.S. Cl.
CPC ............ *H04L 41/28* (2013.01); *F03D 7/0264* (2013.01); *F03D 9/257* (2017.02); *G06F 21/44* (2013.01);
(Continued)

(58) Field of Classification Search
CPC ......... H04L 41/28; H04L 67/20; H04L 63/08; H04L 63/104; F03D 9/257; F03D 7/0264;
(Continued)

(56) References Cited

U.S. PATENT DOCUMENTS

| 9,270,761 B1 * | 2/2016 | Logue ..................... G06F 16/33 |
| 2007/0022473 A1 * | 1/2007 | Hird ........................ H04L 63/08 |
| | | 726/9 |

(Continued)

FOREIGN PATENT DOCUMENTS

| WO | WO2014153673 | * | 2/2014 | ............... F03D 7/00 |
| WO | WO2014153673 A1 | | 10/2014 | |

OTHER PUBLICATIONS

European Office Action for European Patent Application No. 18150806. 0-1218 dated Aug. 2, 2018.

*Primary Examiner* — Umar Cheema
*Assistant Examiner* — Anh Nguyen
(74) *Attorney, Agent, or Firm* — Lempia Summerfield Katz LLC

(57) ABSTRACT

Systems and methods for managing wind power plants (WPPs) having a plurality of wind turbines are provided. The system includes a central server in communication with one or more WPP servers through an external network, wherein each WPP server is associated with a corresponding WPP. The WPP server is in communication with one or more wind turbines in the corresponding WPP through a private network. The central server is configured to identify at least one maintenance activity to be performed based on event information associated with a wind turbine in a WPP. The central server is configured to generate a service operation request (SOR) message including an access request to the turbine based on the identified maintenance activity. The central server transmits the SOR message for approval to an authentication unit and accesses the wind turbine in the first WPP upon approval of the SOR message.

16 Claims, 5 Drawing Sheets

(51) Int. Cl.
*H04L 29/06* (2006.01)
*G06F 21/44* (2013.01)
*F03D 9/25* (2016.01)
*F03D 7/02* (2006.01)
*H02K 7/18* (2006.01)
*H02P 9/08* (2006.01)
*H04L 29/08* (2006.01)

(52) U.S. Cl.
CPC ............... *H02K 7/183* (2013.01); *H02P 9/08* (2013.01); *H04L 63/08* (2013.01); *H04L 63/104* (2013.01); *H04L 67/20* (2013.01); *Y02E 10/725* (2013.01); *Y04S 40/24* (2013.01)

(58) Field of Classification Search
CPC . H02K 7/183; H02P 9/08; G06F 21/44; Y04S 40/24; Y02E 10/725
USPC .......................................................... 709/223
See application file for complete search history.

(56) References Cited

U.S. PATENT DOCUMENTS

| 2011/0145277 | A1* | 6/2011 | Gadre | .................... F03D 17/00 |
| | | | | 707/769 |
| 2017/0264592 | A1* | 9/2017 | Yoda | .................... H04L 45/745 |
| 2017/0363065 | A1* | 12/2017 | Jakobs | ................ H04L 63/0823 |
| 2018/0007087 | A1* | 1/2018 | Grady | ................ H04L 63/0428 |

\* cited by examiner

SYSTEMS AND METHODS FOR MANAGING A PLURALITY OF WIND POWER PLANTS

TECHNICAL FIELD

The present disclosure relates to accessing and managing wind power plants, and more particularly to methods, systems, and apparatuses for accessing and managing a plurality of wind power plants via an external network.

BACKGROUND

With the increase in cyber threats, cyber security regulations may restrict direct communication with Wind Power Plant (WPP) from outside WPP network. Such regulations may make servicing and maintenance activities more cumbersome as such activities are managed remotely.

To address the cyber security regulations, an intermediate device for each WPP may be used. The usage of such an intermediate device may limit the service activities to wind turbines associated only to a particular WPP. This may be disadvantageous as Service Technicians prefer to manage multiple WPPs in parallel.

SUMMARY

This summary is provided to introduce a selection of concepts in a simplified form that are further disclosed in the detailed description. This summary is not intended to identify key or essential concepts of the claimed subject matter, nor is it intended for determining the scope of the claimed subject matter.

In accordance with one aspect, a system is provided for managing a plurality of wind power plants (WPPs) including a plurality of wind turbines. The system includes a central server in communication with one or more WPP servers through an external network, wherein each WPP server is associated with a corresponding WPP of the plurality of WPPs. The WPP server is also in communication with one or more wind turbines in the corresponding WPP through a private network. The central server configured to identify at least one maintenance activity to be performed based on event information associated with a wind turbine in a WPP. The central server is configured to generate a service operation request (SOR) message including an access request to the turbine based on the identified maintenance activity. The central server then transmits the SOR message for approval to an authentication unit and accesses the wind turbine in the first WPP upon approval of the SOR message.

The SOR message includes a header having a WPP identifier, a wind turbine identifier, a SOR version, and a timestamp. The SOR message also includes an operation field including at a SOR activity to be performed on the wind turbine and a SOR event field including SOR events that occur during implementation of the SOR activity on the at least one wind turbine. The operation field in turn includes a pre-condition field with pre-conditions to initiate the SOR activity and an execution field having directions to execute the SOR activity. The operation field further includes a target field including the WPP identifier of the first WPP and the wind turbine identifier associated with the wind turbine on which the SOR activity is to be performed and a post-condition field with post-conditions to verify success of performing the SOR activity.

In addition, the SOR message includes a SOR action field including an approval status, a review status, and/or a data monitoring request associated with the SOR activity. Further, the SOR message includes a digital signature based on a level of the access request in the SOR message.

In accordance with another aspect, there is provided a method of managing a plurality of wind power plants (WPPs) including a plurality of wind turbines. The method includes identifying a maintenance activity to be performed based on event information associated with a wind turbine in a first WPP. The method includes generating a service operation request (SOR) message including an access request to the wind turbine based on the identified maintenance activity. The method further includes transmitting the SOR message for approval to an authentication unit and accessing the at least one wind turbine in the first WPP upon the approval of the SOR message.

In accordance with yet another aspect, there is provided a system of managing a plurality of wind power plants (WPPs) including a plurality of wind turbines. The system includes a central server in communication with one or more WPP servers through an external network, wherein each WPP server is associated with a corresponding WPP of the plurality of WPPs and is in communication with one or more wind turbines in the corresponding WPP through a private network. The system further includes an authentication unit in communication with the one or more WPP servers and the central server through the external network. The authentication unit is configured to receive a service operation request (SOR) message including an access request to a wind turbine in a first WPP and to verify the received SOR message. The authentication unit is also configured to transmit one of an approval message and a rejection message in relation to the access request in the SOR message based on the verification of the SOR message. The authentication unit includes a memory for storing the SOR messages received from the central server and a graphical user interface to display the SOR message as an alert.

BRIEF DESCRIPTION OF THE DRAWINGS

The present disclosure is further described hereinafter with reference to illustrated embodiments shown in the accompanying drawings, in which.

Figure 1:
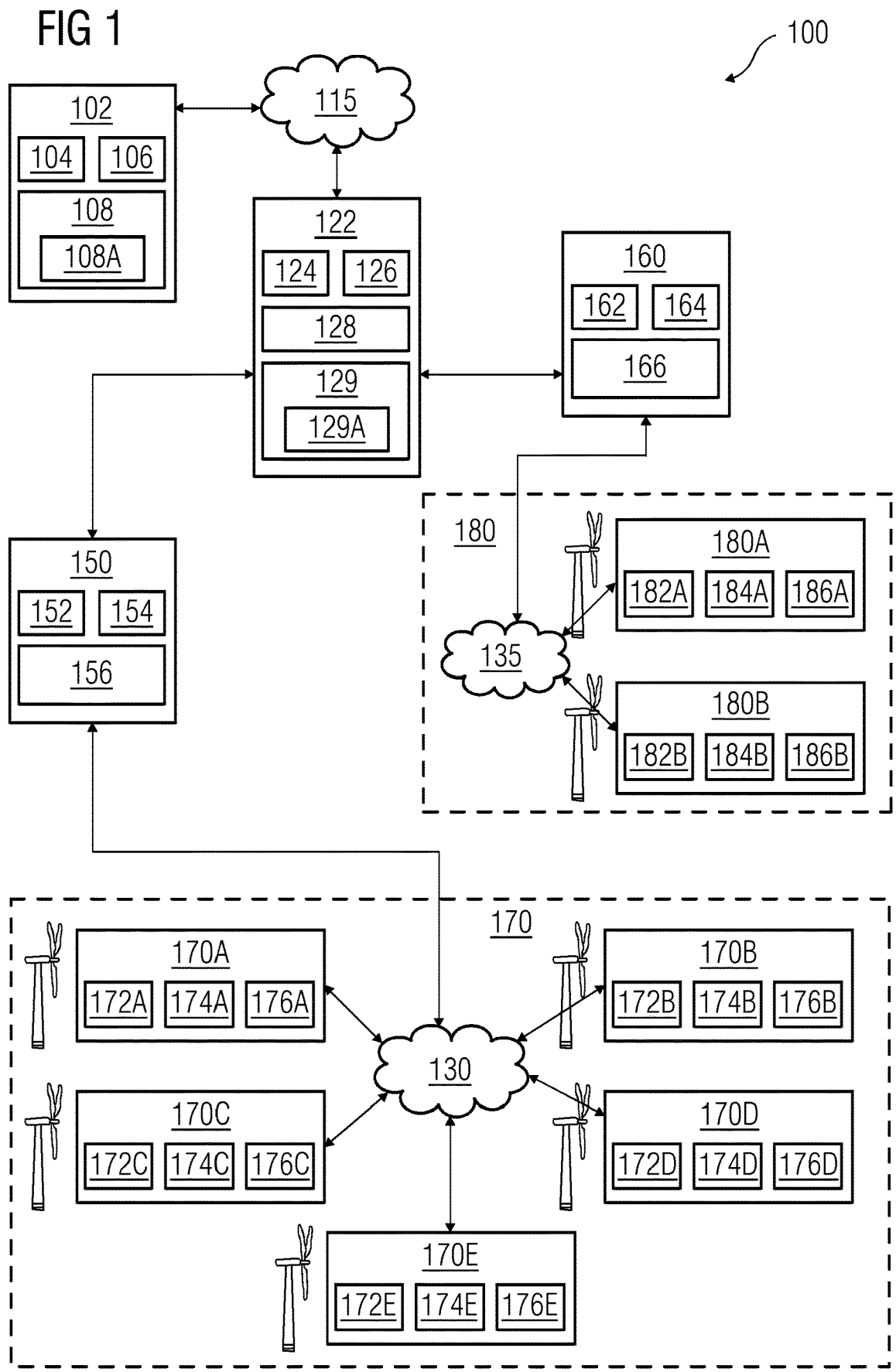
FIG. 1 depicts a block diagram illustrating a system for managing a plurality of wind power plants (WPPs) according to an embodiment.

The foregoing summary, as well as the following detailed description, is better understood when read in conjunction with the appended drawings. For the purpose of illustrating the disclosure, exemplary constructions are shown in the drawings. However, the disclosure is not limited to the specific methods and structures disclosed herein. The description of a method act or a structure referenced by a numeral in a drawing is applicable to the description of that method act or structure shown by that same numeral in any subsequent drawing herein.

DETAILED DESCRIPTION

For the purpose of the description the term "private network" refers to a network that belong to a third party responsible for the operation of the wind power plants (WPPs. For example, the private network is the network within the demilitarized zone (DMZ) perimeter of the WPPs and is not directly accessible from outside the DMZ perimeter. The term to "external network" that is external to the private network and the DMZ perimeter. The external network includes Internet and Virtual Private Networks (VPNs).

Further, for clarity, the term "event information" refers to an event that occurs in relation to the maintenance and operation of a wind turbine or a wind farm. The event includes upgradation of a software or change in operation parameters such as change in wind speed. The event information may also be derived from the operational data of the wind turbine. For example, outliers in the operational data of the wind turbine may generate the event. The term "maintenance activity" relates to an activity to be performed on the wind turbine based on the event information. For example, change in shut down time of the wind turbine due to the change in wind speed. The term "field" in relation to structure of a Service Operation Request (SOR) message is computer instruction that has a purpose and, in certain instances, a fixed size in the SOR message. The purpose of each field in the SOR message is defined in the below description.

FIG. 1 is a block diagram illustrating a system 100 for managing a plurality of wind power plants (WPPs) 170 and 180. Each WPP 170 and 180 has a plurality of wind turbines 170A-E and 180A-B, respectively. Each wind turbine 170A-E and 180A-B includes a processor 172A-E and 182A-B, a sensor unit 174A-E and 184A-B, and a communication unit 176A-E and 186A-B.

The system 100 also includes a central server 102, WPP servers 150, 160, and an authentication unit 122. The WPP servers 150 and 160 are servers configured on demilitarized zone (DMZ) perimeter of the WPPs 170 and 180, respectively. The WPP servers 150 and 160 include processors 152 and 162, communication units 154 and 164, and memory 156 and 166. Further, each WPP server 150 and 160 is associated with corresponding WPPs 170 and 180, respectively. Furthermore, each WPP server 150 and 160 is in communication with the wind turbines 170A-E and 180A-B through private networks 130 and 135, respectively.

As shown in FIG. 1, the central server 102 is in communication with the authentication unit 122 through an external network 115. In an embodiment, wherein the authentication unit is a module in the one or more WPP servers, the central server communicates with the WPP servers via the external network. The central server 102 includes a processor 104, a communication unit 106, and a memory 108. As used herein, "memory" refers to all computer readable media, for example, non-volatile media, volatile media, and transmission media except for a transitory, propagating signal. The memory 108 is configured to store computer program instructions defined by modules, for example 108A. The processing unit 104 is configured to execute the defined computer program instructions in the module 108A. The module 108A is a Service Operation Request (SOR) module 108A that includes instructions regarding generation of SOR messages. The SOR messages are generated to include a header, action field, event field, etc. The structure of the SOR message is further elaborated in FIG. 2.

Figure 5:
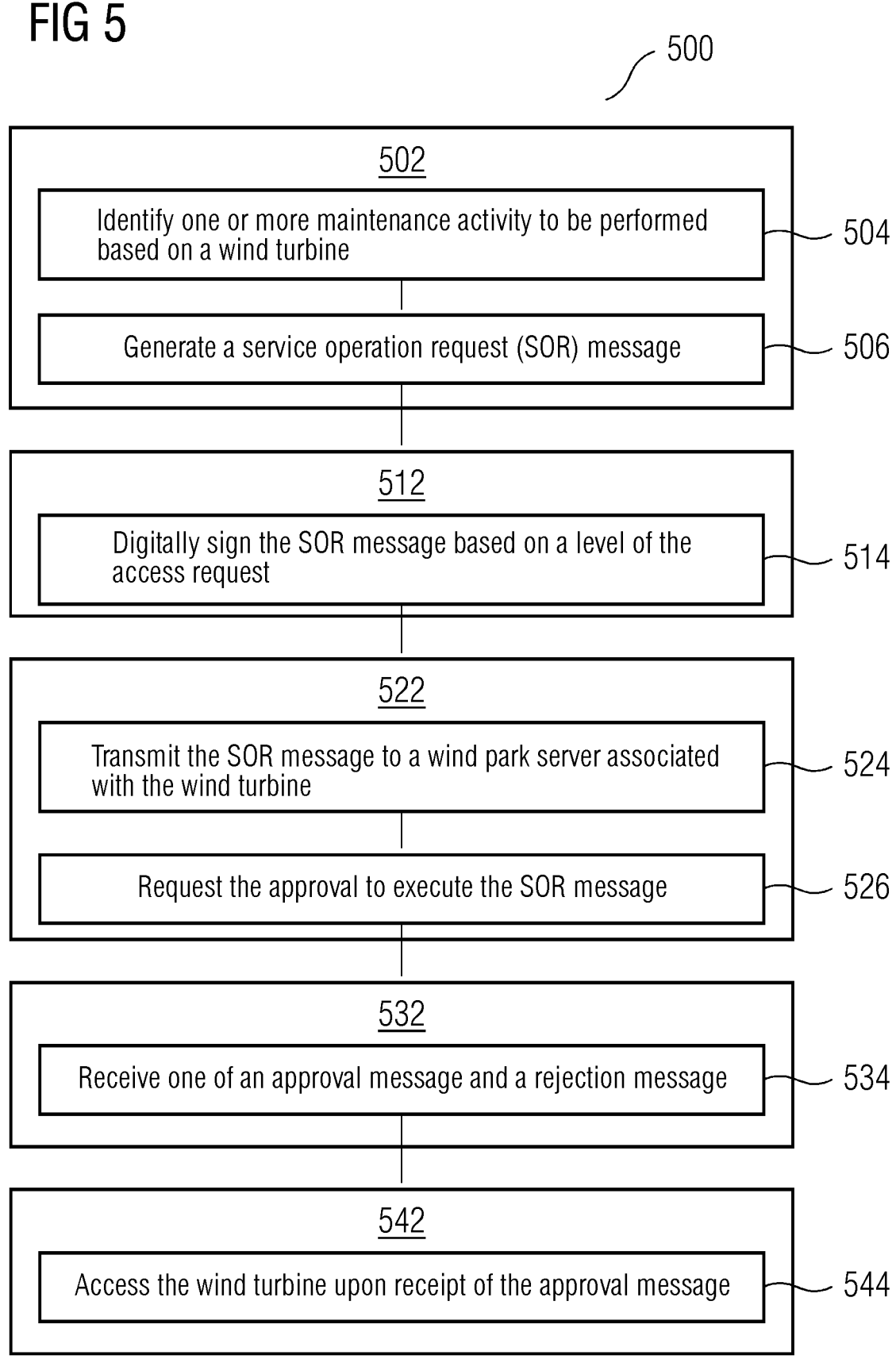
FIG. 5 depicts a process flowchart illustrating a method for managing the plurality of WPPs according to an embodiment.

The SOR module 108A is executed in accordance with the acts disclosed in FIG. 5. For the purpose of explanation, the wind turbine 170A in WPP 170 is considered. During execution of the SOR module 108A, the central server 102 is configured to identify maintenance activity to be performed based on event information associated with the wind turbines 170A. The central server 102 is configured to generate the SOR message including an access request to the wind turbine 170A based on the identified maintenance activity. As used herein, "access request" relates to a command for controlling the wind turbine 170A identified by a wind turbine identifier in the SOR message. The SOR message is sent by central server 102 to the authentication unit 122 over the external network 115. The SOR message is transmitted for approval, to access the wind turbine 170A, and to perform a SOR activity on the wind turbine 170A. The authentication unit 122 is in communication with the WPP server 150 and determines whether the SOR message must be approved. Accordingly, the SOR message is reviewed, and upon approval, the central server 102 accesses the wind turbine 170A.

As shown in FIG. 1, the system 100 also includes the authentication unit 122. The authentication unit 122 of the system 100 is also referred to as a SOR Administrator or a Site Administrator, responsible for the operation of the WPPs 170 and 180. The authentication unit 122 in FIG. 1 is a separate server that interacts with the WPP servers 150 and 160. In an embodiment, the authentication unit 122 may be a module residing in the WPP server 150 and 160. The authentication unit 122 includes a processor 124, a communication unit 126, a graphical under interface 128, and memory 129. The memory 129 includes computer readable instructions defined as modules, such as a SOR approval module 129A. The authentication unit 122 communicates with the WPP servers 150 and 160 directly. In an embodiment, the authentication unit may also communicate to the WPP servers 150 and 160 through the external network 115.

During operation of the system 100, the central server 102 transmits the SOR message to the authentication unit 122. In an embodiment, where the authentication unit is a module in the WPP server, the SOR message is transmitted to the WPP server 150. In another embodiment, the authentication unit 122 is configured to view the SOR message on an application accessible to the WPP server 150 and the authentication unit 122. For example, the authentication unit 122 may get a notification as an alert in a User Interface Dashboard.

Upon receipt of the SOR message, the SOR approval module 129A is executed by the processor 124 to verify the received SOR message. Based on the verification of the SOR message, the communication unit 126 transmits either an approval message or a rejection message in relation to the access request in the SOR message. If the approval message is transmitted to the central server 102, the SOR message will be executed as per a pre-defined strategy, such as immediate autonomous execution, timed/delayed execution or only when triggered explicitly. The method of managing the WPPs 150 and 160 is further explained in FIG. 5.

Figure 2:
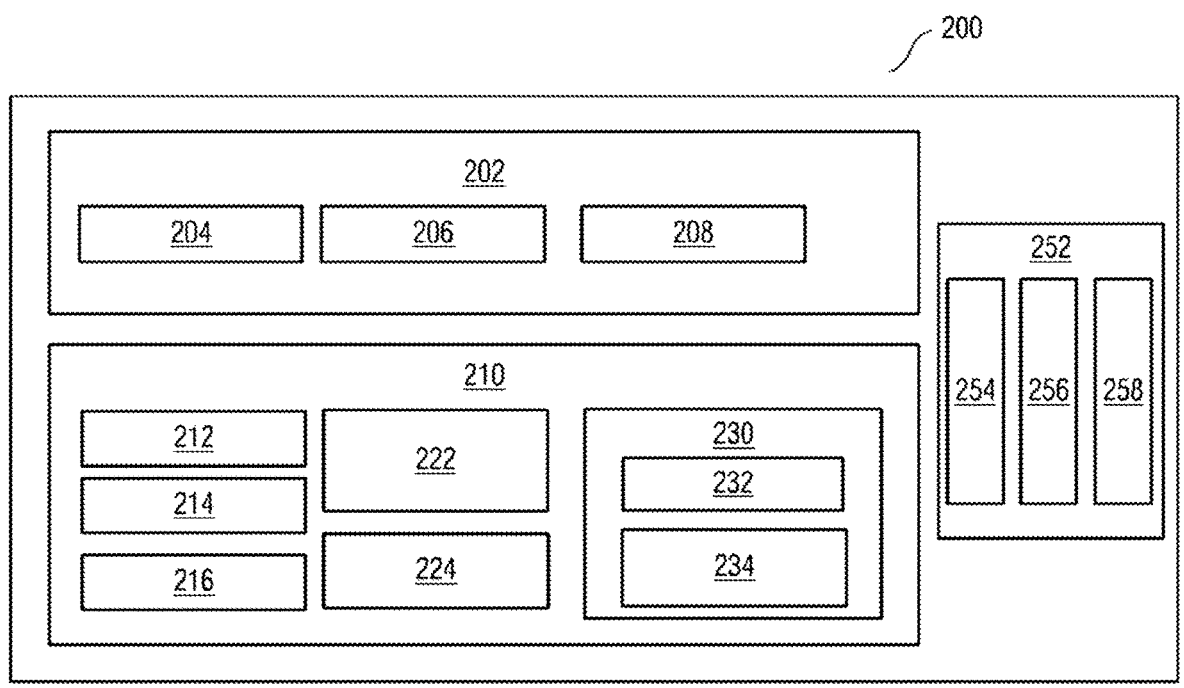
FIG. 2 depicts a schematic representation of a Service Operation Request (SOR) message, according to an embodiment.
Figure 3:
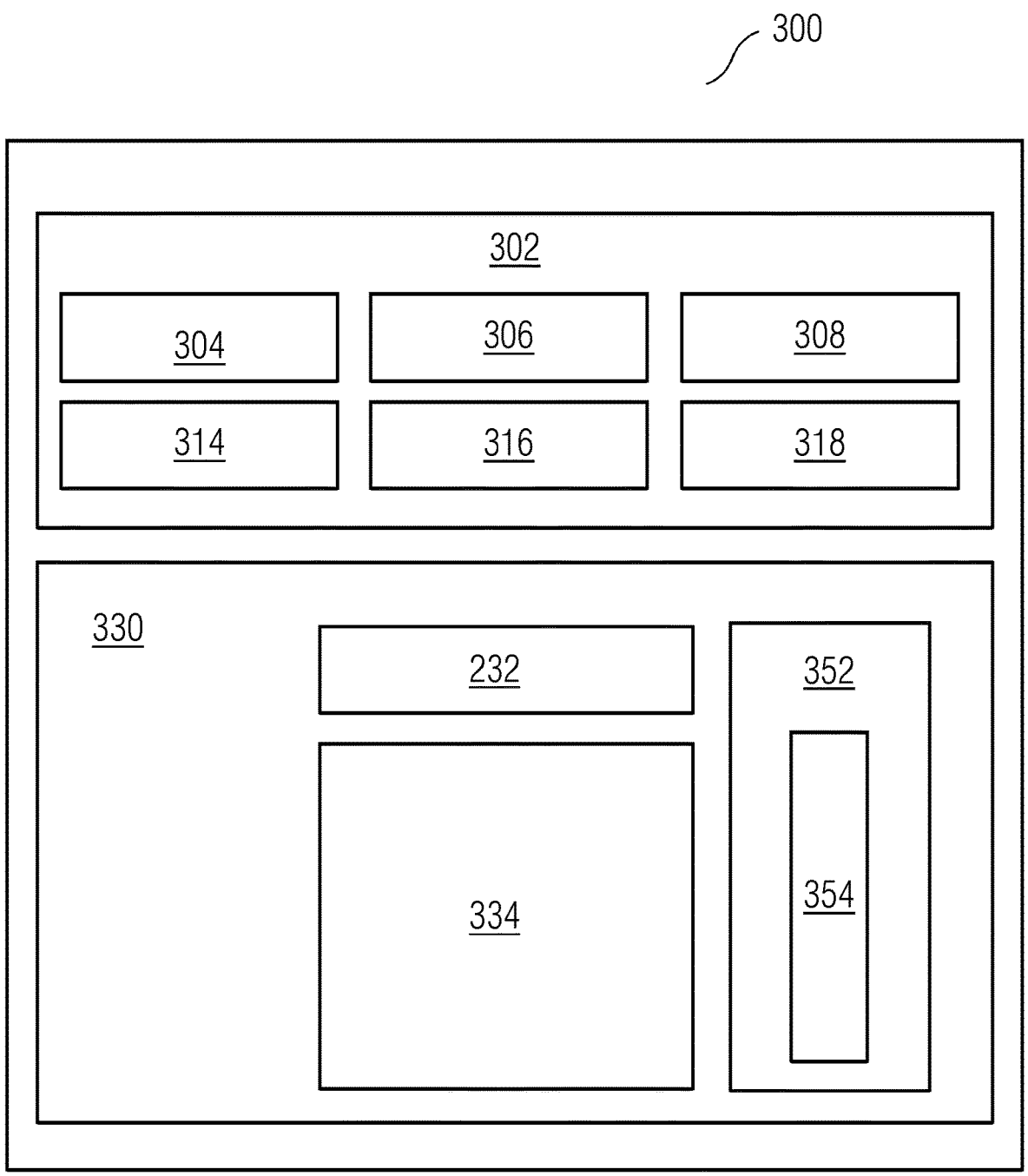
FIG. 3 depicts a schematic representation of a SOR action field in the SOR message, according to an embodiment.
Figure 4:
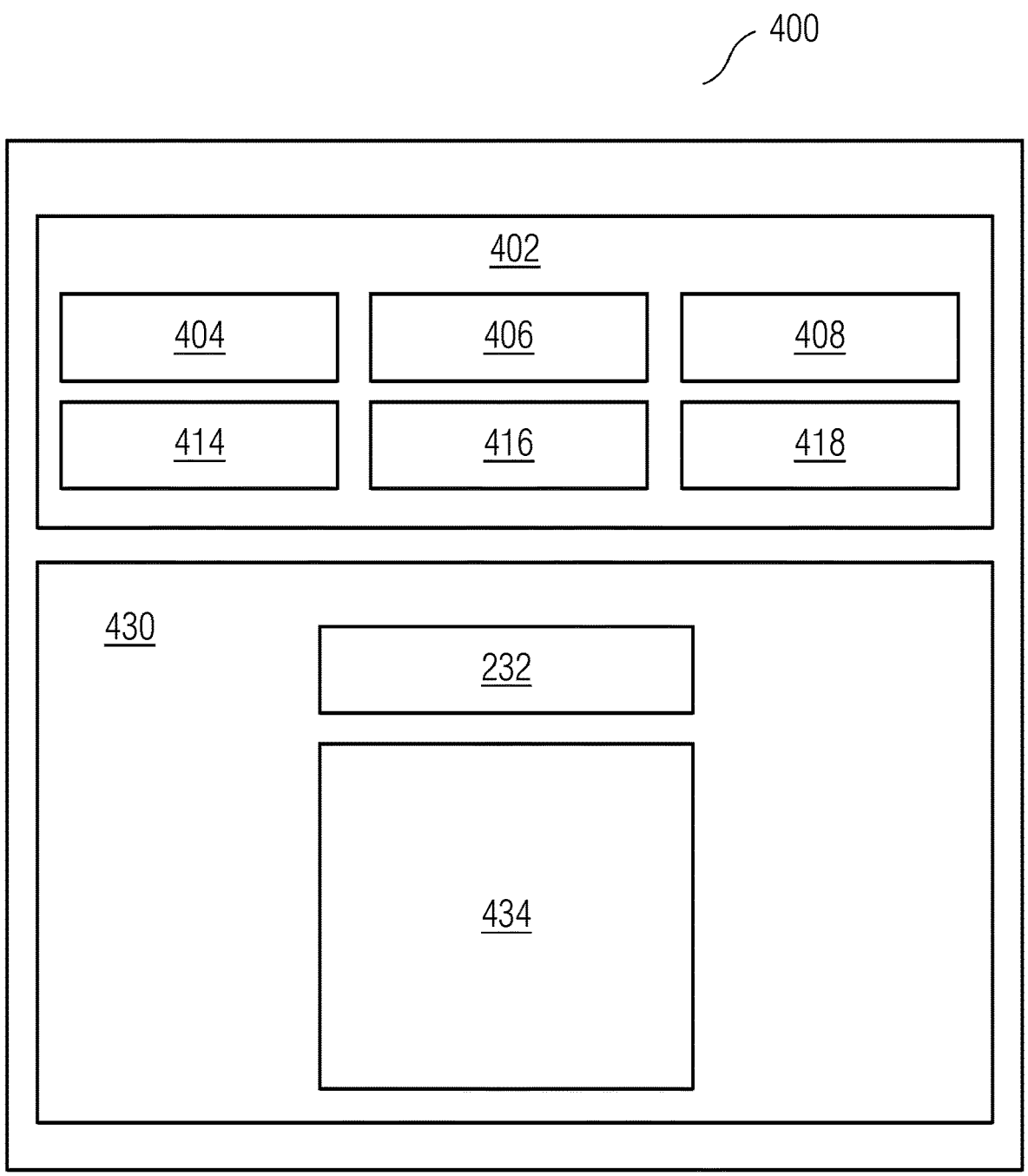
FIG. 4 depicts a schematic representation of a SOR event field in the SOR message, according to an embodiment.

FIG. 2 is a schematic representation of a Service Operation Request (SOR) message 200. The structure of the SOR message may be divided into three major sections a header 202, an operation field 210, and a signature field 252. The SOR message 200 may include other sections such as a SOR action field and a SOR event field as indicated in FIGS. 3 and 4.

As shown in FIG. 2, the header 202 contains a unique identifier 204 to identify the SOR message and to avoid replay attacks, a SOR version 206 to indicate the version of the SOR message, and a timestamp 208 that is assigned at the time of creation of the SOR message 200.

The SOR message 200 also includes the operation field 210 that contains various parameters related to at least one SOR activity to be performed on a wind turbine (for example wind turbine 170A). The operation field 210 includes: (i) A pre-condition field 212 including pre-conditions that need to be satisfied prior to initiating the SOR activity; (ii) A post-condition field 214 including post-conditions to verify success of performing the SOR activity; (iii) An impact field 216 indicating the impact the SOR activity will have on the wind turbine operation; (iv) A set of Input parameters 222; (v) An execution field 224 including directions to execute the SOR activity (For example, the execution field 224 includes parameter values indicating the directions to execute the SOR message such as automatic execution or manually triggered execution, etc. The execution field 224 also includes time slot preference indicating preferred start time and end time for performing the SOR activity); and (vi) A target field 230 including a WPP identifier 232 of the WPP and a wind turbine identifier 234 associated with the wind turbine on which the SOR activity is to be performed. In an embodiment, the wind turbine identifier is defined by Internet Protocol (IP) Addresses of the wind turbine.

The SOR message 200 also includes the signature field 252. The signature field 252 includes an originator field 254, an initiator field 256, and a reviewer field 258. The signature field 252 is used to protect the SOR message by way of digital signatures. Depending upon a level of protection/severity of the SOR message, there may be one or more signatures present in the SOR message 200. The level of protection may be referred to as a level of access including an observer level, an operator level, a maintenance level, and an administrator level.

The advantage of the signature field 252 is that the signature field protects the SOR message from being misused by providing that the contents of the SOR message are not modified after the digital signature is added. If the contents of the SOR message 200 are modified after digitally signing, the digital signature becomes invalid and may be filtered out.

FIG. 3 is a schematic representation of a SOR action field 300 in a SOR message. The SOR action field 300 indicates the SOR activities that have been initiated by a Service Technician. The SOR action field 300 may include an approval status, a review status, and/or a data monitoring request associated with the SOR activity. The SOR action field 300 includes a SOR action header 302. The SOR action header 302 further includes a SOR action reference 304 to reference the SOR action field with the SOR message. In an embodiment, the SOR action reference 304 also includes the unique identifier indicated in FIG. 2 as a reference to the SOR message.

The SOR action header 302 also includes an action type 306, an action timestamp 308, an action summary 314, an action source 316, and a SOR status 318. The SOR status 318 includes the status information of the SOR message, e.g., whether the SOR message has been approved or rejected.

The SOR action field 300 also includes an action target 330. The action target 330 includes the wind power plant identifier 232 and the IP Address of the wind turbine, start and end time of execution of the SOR message in the field 334. In addition, the SOR action field 300 is protected against tampering by an action signature field 352 indicating originator of the SOR activity in an originator field 354.

FIG. 4 is a schematic representation of a SOR event field 400 in the SOR message. The SOR event field 400 includes SOR events that occur during implementation of the SOR activity on the wind turbine. The SOR event field 400 is generated from an event log transmitted from the WPP servers to the central server via the authentication unit. The SOR event field 400 includes status from the WPP server regarding the actions taken on the wind turbine, when a monitored value changes.

The SOR event field 400 includes an event header 402 and an event field 430. The event header 402 includes an event reference 404, an event type 406, an event timestamp 408, an event summary 414, an event source 416, and an event status 418. The event reference 404 includes reference to the unique identifier and the SOR action reference. The event field 430 includes the WPP identifier 232 and event description 434. The event description 434 includes event details in Extensible Markup Language (XML) format.

FIG. 5 is a process flowchart illustrating a method 500 for managing a plurality of WPPs. The method includes five stages, e.g., creation or generation of a SOR message 502, verification 512, transmission 522, approval 532, and execution 542.

The method begins, at act 504, with identifying one or more maintenance activity that needs to be performed on a wind turbine in a WPP. The maintenance activity is determined based on event information associated to an event that occurs in relation to the maintenance and operation of a wind turbine or a wind farm.

Based on the maintenance activity, the SOR message is generated at act 506. For example, a service technician may create the SOR message on a Central server of a specific type based on the maintenance activity. The SOR message may be generated through a user interface, Application Program Interface (API), or by cloning an existing SOR message.

When the SOR message is generated through the user interface, a Service Technician may specify parameter values to generate the SOR message. The parameter values are based on event information associated with the wind turbine, such as upgradation of software in the wind turbine.

When the SOR message is generated though API, the API is used for submitting the SOR message. This method of generating the SOR message enables existing tools for service and maintenance of Wind Power plants to be used with minimal changes at an interface level.

The SOR message may also be generated by cloning the existing SOR message. The SOR message is cloned by modifying a target field and an operation field in the SOR message. Once the SOR messages are generated, the SOR messages will be processed in the similar way, irrespective of the manner in which the SOR message is generated.

The SOR messages are verified in the verification stage 512. In the verification stage 512, the SOR message is reviewed to provide that various fields in the SOR message are correctly entered. After verification, the SOR message is protected by digitally signing the SOR message at act 514. At the end of the verification stage 512, the SOR messages are cleared for transmission.

In the transmission stage 522, the SOR messages may be moved from the central server to the authentication server directly. The SOR message may be transmitted in several ways such as replication initiated from the central server, replication initiated from the authentication unit, manual import, and transmission as an offline file.

When the SOR message is transmitted through replication initiated from the central server, the central server initiates a database replication to the authentication unit or the WPP server (e.g., when the authentication unit is a module in the WPP server). Replication logs are used keep track of replication status of the SOR message. On the other hand, when replication is initiated from the authentication unit, the SOR messages are extracted by way of updates from the central server. The inflow of the SOR messages may be controlled by using filters to select SOR message type.

In manual import, the SOR messages may be imported manually by a customer representative through the user interface provided on the central server, the WPP server and the authentication server. The user interface supports the option to check for available incoming SOR messages and downloading the SOR messages associated with a desired WPP. When the SOR message is transmitted as an offline file, the SOR message is transmitted with tamper avoiding features, such as encrypted email.

In the transmission stage 522, the central server also requests approval to execute the SOR message at act 526. The request also includes an access request including a command for controlling the wind turbine on which SOR activity needs to be performed.

Upon receiving the SOR message through any of the above systems or methods, the authentication unit will get a notification, by one or more of the following methods: (i) As a notification popup in the User Interface; (ii) As a text message in a mobile computing device of the customer representative; (iii) As an email in a registered inbox of the customer representative; or (iv) As automated telephone call alert on a registered phone number.

In the approval stage 532, the authentication unit inspects the details of the SOR message and sends either an approval message or a rejection message. Accordingly, at act 534, the central server receives the approval message or the rejection message. The rejection message may be accompanied with a remark indicating the reason for rejecting execution of the SOR message.

In the execution stage 542, approved SOR messages are provided in an execution queue immediately after the approval. However, the execution queue is processed according to timeslot and priority as indicated in each of the SOR messages. Therefore, the SOR message will not get executed unless the current time matches with the preferred timeslot. Once all pre-requisites are met, the SOR message will get picked up by a corresponding "handler," e.g., a software component meant to execute the SOR message on the wind turbine.

In addition to execution of the SOR message by the handler, the central server in act 544 accesses the wind turbine to monitor the execution of the SOR message. The execution of the SOR message may be monitored in many ways. One of the methods for monitoring is through remote monitoring by Service Technician. The Service Technician who initiated the SOR message monitors the execution through SOR events and corresponding SOR actions that are transmitted to the central server. For example, the SOR message upon execution may induce a continuous data flow of certain wind turbine parameters for a particular time period. This is then monitored by the Service Technician. Accordingly, the method provides a reliable and real-time user experience for the Service Technician.

Another method of monitoring execution of the SOR message is through progress tracking by the authentication unit operated by the Site Administrator. The authentication unit may track the progress of the execution. The SOR messages may be executed sequentially, so that the authentication unit may be configured to suspend the execution of the SOR messages on all remaining target wind turbines, if it an unexpected observation is made on a particular wind turbine.

The advantage of the system and method as disclosed above is that the system or method eliminates the need for a direct remote interactive connection to the WPP and the wind turbines. Instead, a SOR message created at the central server may be transmitted to the WPP server, which is capable of interpreting and processing the commands/instructions/parameter values provided within the SOR message. In addition, it provides the flexibility to the customer representative, e.g., Site Administrator to approve/reject the submitted SOR messages through the authentication unit. The Site Administrator is able view details such as criticality of executing the SOR message, motivation behind the SOR message, down-time of the wind power plant or the wind turbine required for the SOR activity. Based on the criticality provided in the SOR message, the customer representative may also visit the WPP during the execution needed for the suggested timeslot.

Apart from the above advantages, the present disclosure also supports protocol conversion. The SOR message may be configured to adopt a generic protocol whereas the WPP server that processes the SOR message may continue using a legacy protocol, which may contain known vulnerabilities. Through the above-mentioned system and method, the SOR messages will limit the usage of legacy protocols within the WPP boundaries. Further, the SOR messages are auditable compliance towards security standards. The SOR messages support offline transmission methods so that the WPP server may lock down all remote interactive communication. This in turn provides usage industry standard of read only channels for transferring the execution feedbacks back to central server.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present disclosure has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A system for managing a plurality of wind power plants (WPPs), each wind power plant comprising a plurality of wind turbines, the system comprising:
a central server comprising a processor and a memory, wherein the central server is in communication with a plurality of WPP servers through an external network, wherein each WPP server of the plurality of WPP servers is associated with a corresponding WPP of the plurality of WPPs and is in communication with the plurality of wind turbines in the corresponding WPP through a private network,
wherein the processor and memory of the central server are configured to:
identify at least one maintenance activity to be performed based on event information associated with at least one wind turbine of the plurality of wind turbines in a first WPP;
generate a service operation request (SOR) message comprising an access request to the at least one wind turbine based on the identified maintenance activity and a command for controlling the at least one wind turbine identified by a wind turbine identifier;

transmit, to an authentication server over the external network, the SOR message for approval, wherein the authentication server is positioned between the central server and the plurality of WPPs;

receive, from the authentication server in communication with the central server and the WPP server, an approval message or a rejection message in relation to the access request in the SOR message; and access, via the private network, the at least one wind turbine in the first WPP when the approval message is received from the authentication server, wherein the command for controlling the at least one wind turbine within the SOR message is executed.

2. The system as claimed in claim 1, wherein the authentication server is operated by a third-party server responsible for the operation of the first WPP.

3. The system as claimed in claim 1, wherein the central server is further configured to:

monitor execution of the SOR message based on SOR events generated by the at least one wind turbine during the execution of the SOR message.

4. The system as claimed in claim 1, wherein the SOR message comprises:

a header comprising a WPP identifier, a wind turbine identifier, a SOR version, and a timestamp;

an operation field comprising at least one SOR activity to be performed on the at least one wind turbine; and a SOR event field comprising SOR events that occur during implementation of the at least one SOR activity on the at least one wind turbine.

5. The system as claimed in claim 4, wherein the operation field further comprises:

a pre-condition field comprising pre-conditions to initiate the at least one SOR activity;

an execution field comprising directions to execute the at least one SOR activity;

a target field comprising the WPP identifier of the first WPP and the wind turbine identifier associated with the at least one wind turbine on which the at least one SOR activity is to be performed; and a post-condition field comprising post-conditions to verify success of performing the at least one SOR activity.

6. The system as claimed in claim 1, wherein the SOR message comprises:

a SOR action field comprising an approval status, a review status, and a data monitoring request associated with at least one SOR activity.

7. The system as claimed in claim 1, wherein the SOR message comprises:

at least one digital signature based on a level of the access request.

8. The system of as claimed in claim 7, wherein the level of the access request comprises one of an observer level, an operator level, a maintenance level, and an administrator level.

9. The system as claimed in claim 1, wherein the at least one wind turbine comprises:

at least one sensor for collecting operational data for the at least one wind turbine; and a communication unit communicatively coupled to the WPP server through the private network.

10. The system of as claimed in claim 1, wherein the event information associated with the at least one wind turbine comprises one or more events occurring during operation of the at least one wind turbine.

11. A method for managing a plurality of wind power plants (WPPs), each WPP comprising a WPP server and a plurality of wind turbines, the method comprising:

identifying, by a central server, at least one maintenance activity to be performed based on event information associated with at least one wind turbine of the plurality of wind turbines in a first WPP;

generating, by the central server, a service operation request (SOR) message comprising an access request to the at least one wind turbine based on the identified maintenance activity and a command for controlling the at least one wind turbine identified by a wind turbine identifier;

transmitting, by the central server to an authentication server over an external network, the SOR message for approval, wherein the authentication server is positioned between the central server and the plurality of WPPs;

receiving, from the authentication server in communication with the central server and the WPP server, an approval message or a rejection message in relation to the access request in the SOR message; and accessing, by the central server via a private network, the at least one wind turbine in the first WPP when the approval message is received from the authentication server, wherein the command for controlling the at least one wind turbine within the SOR message is executed.

12. The method as claimed in claim 11, wherein the transmitting of the SOR message for approval, to a first WPP server associated with the first WPP, comprises:

requesting the approval to execute the SOR message.

13. The method as claimed in claim 11, wherein the SOR message comprises:

a header comprising a WPP identifier, a wind turbine identifier, a SOR version, and a timestamp;

an operation field comprising at least one SOR activity to be performed on the at least one wind turbine; and a SOR event field comprising SOR events that occur during implementation of the at least one SOR activity on the at least one wind turbine.

14. The method as claimed in claim 11, wherein the generating of the SOR message comprises changing an operation field or a target field in an existing SOR message.

15. The method as claimed in claim 11, further comprising:

digitally signing the SOR message based on a level of the access request.

16. A system for managing a plurality of wind power plants (WPPs), each wind power plant comprising a plurality of wind turbines, the system comprising:

a central server comprising a processor and a memory, wherein the central server is in communication with a plurality of WPP servers through an external network, wherein each WPP server of the plurality of WPP servers is associated with a corresponding WPP of the plurality of WPPs and is in communication with the plurality of wind turbines in the corresponding WPP through a private network, wherein each WPP server of the plurality of WPP servers is positioned at a perimeter of the private network of the respective WPP such that all communication between each WPP server and its respective WPP is through the private network, wherein a WPP server of the plurality of WPP servers comprises a processor and memory, wherein the WPP server of the plurality of WPP servers is in communication with the central server through the external network, and wherein the processor and memory of the WPP server are configured to:
  receive a service operation request (SOR) message, from the central server via the external network, comprising an access request to at least one wind turbine of the plurality of wind turbines in a first WPP and a command for controlling the at least one wind turbine identified by a wind turbine identifier;
  store the SOR message received from the central server;
  display the SOR message as an alert via a graphical user interface;
  verify the received SOR message; and
  transmit an approval message or a rejection message in relation to the access request in the SOR message based on the verification of the SOR message,
wherein the central server is configured to receive, from the WPP server, the approval message or the rejection message in relation to the access request in the SOR message and access the at least one wind turbine in the first WPP via the private network when the approval message is received from the WPP server, wherein the command for controlling the at least one wind turbine within the SOR message is executed.

* * * * *